United States Patent [19]

Jung et al.

[11] Patent Number: 5,794,169
[45] Date of Patent: Aug. 11, 1998

[54] SYSTEM FOR DETERMINING THE SHIFT STAGE OF AN AUTOMATIC TRANSMISSION BY USING FUZZY INFERENCE TO DECIDE ROAD GRADIENT

[75] Inventors: Soo-Yong Jung; Hun Kang, both of Seoul, Rep. of Korea

[73] Assignee: Hyundai Motor Company, Seoul, Rep. of Korea

[21] Appl. No.: 544,820

[22] Filed: Oct. 18, 1995

[30] Foreign Application Priority Data

Oct. 19, 1994 [KR] Rep. of Korea ............... 1994-26747

[51] Int. Cl.$^6$ ............................................. G06G 7/70
[52] U.S. Cl. ................. 701/57; 701/58; 701/51; 477/121; 477/125
[58] Field of Search .............. 364/424.086, 431.07, 364/431.04, 424.081, 424.08, 150, 151, 424.092, 424.095, 424.088, 424.094, 424.091, 426.022; 395/900, 905; 477/906, 43, 34, 125, 131, 94, 97, 107, 120, 901–903, 121, 127; 701/51, 57, 59, 58, 55

[56] References Cited

U.S. PATENT DOCUMENTS

| | | | |
|---|---|---|---|
| 5,019,979 | 5/1991 | Takahashi | 364/424.086 |
| 5,099,428 | 3/1992 | Takahashi | 364/424.086 |
| 5,101,350 | 3/1992 | Tokoro | 364/424.086 |
| 5,124,916 | 6/1992 | Tokoro et al. | 364/424.086 |
| 5,361,207 | 11/1994 | Hayofune | 364/424.086 |
| 5,390,117 | 2/1995 | Graf et al. | 364/424.086 |
| 5,471,559 | 11/1995 | Yasunobu et al. | 364/424.086 |
| 5,519,610 | 5/1996 | Tsutsui et al. | 364/424.081 |
| 5,555,170 | 9/1996 | Nakashima | 395/900 |
| 5,557,521 | 9/1996 | Danz et al. | 364/424.086 |
| 5,562,570 | 10/1996 | Nakashima | 364/424.086 |
| 5,566,072 | 10/1996 | Momose et al. | 364/436 |

*Primary Examiner*—Jacques H. Louis-Jacques
*Attorney, Agent, or Firm*—Finnegan, Henderson, Farabow, Garrett & Dunner, L.L.P.

[57] ABSTRACT

A process for determining the optimum shift stage of an automatic transmission by using fuzzy inference. The process comprises the steps of obtaining the algorithms for learning road gradient by fuzzy clustering. The algorithm for deciding road gradient is then obtained by using fuzzy inference. Finally, the optimum shift stage is determined by operation of a fuzzy inference engine.

7 Claims, 2 Drawing Sheets

SYSTEM FOR DETERMINING THE SHIFT STAGE OF AN AUTOMATIC TRANSMISSION BY USING FUZZY INFERENCE TO DECIDE ROAD GRADIENT

BACKGROUND OF THE INVENTION

The present invention concerns a system for determining the optimum shift stage of an automatic transmission according to a road condition on which a vehicle runs, and more particularly such system involving a fuzzy system for determining the optimum shift stage by using fuzzy inference based on a vehicle speed, acceleration, throttle position, and current shift stage.

Conventionally, the system for determining the road gradient requires an additional gradient sensor for detecting a road gradient, which complicates the road detecting mechanism. Moreover, the road gradient is calculated based on the engine output, vehicle running resistance, accelerations, throttle valve position, gradient map, etc., thus making a correct inference difficult.

SUMMARY OF THE INVENTION

It is an object of the present invention to provide a fuzzy system for determining the optimum shift stage of a automatic transmission by using fuzzy inference based on a vehicle speed, acceleration, throttle position, and current shift page.

According to present invention, there is provided a process for determining the optimum shift stage of an automatic transmission comprises the steps of:

obtaining the algorithms for learning road gradient by fuzzy clustering;

obtaining the algorithm for deciding road gradient by using fuzzy inference; and determining the optimum shift stage by operation of a fuzzy inference processor.

Preferably, the inventive system comprises a fuzzy input part for collecting the data of the vehicle speed, acceleration, throttle position and current shift stage, a fuzzy control for controlling the data collected by the fuzzy input part, and a transmission drive for making a gear shift to the optimum shift stage.

BRIEF DESCRIPTION OF THE ATTACHED DRAWINGS

FIG. 1 is a flow chart for schematically illustrating a process to determine the shift stage of an automatic transmission by using fuzzy inference to decide road gradient according to an embodiment of the present invention;

FIG. 2 is a block diagram for illustrating the concept of a system to determine the shift stage of an automatic transmission by using fuzzy inference to decide road gradient according to another embodiment of the present invention; and FIG. 3 is a schematic diagram for illustrating the mechanism to obtain road gradient by using centroid defuzzification according to an embodiment of the present invention.

The present invention will now be described more specifically with reference to the drawings attached only by way of example.

DESCRIPTION OF THE PREFERRED EMBODIMENTS

Figure 1:
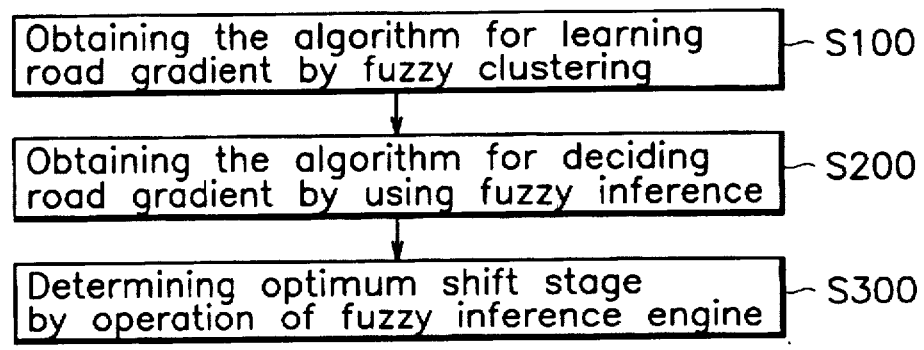

Referring to FIG. 1, the inventive process for determining the shift stage of an automatic transmission by using fuzzy inference includes the steps of obtaining the algorithms for learning road gradient by fuzzy clustering (S100), obtaining the algorithm for deciding road gradient by using fuzzy inference (S200), and determining the optimum shift stage by operation of a fuzzy inference processor (S300).

In the step S100, an automatic transmission simulator performs a vehicle drive simulation along a crisp, straight, level road according to various shift stages and road gradients in order to obtain the data representing the vehicle state. The data is then used to obtain the fuzzy rule applied to an actual situation. The algorithm to obtain the fuzzy rule proceeds through the following four steps.

First, data is obtained for various running modes by using a simulator. The data includes vehicle speed Vo, acceleration Gx, throttle position $\phi$, and gradient $\theta$. In this case, data is preferably chosen so that the vehicle speed has a value between 10Km/h and 80Km/h, the throttle position has a value between 0% and 100%, and the gradient has a value between $-8°$ and $+8°$. In addition, the obtained data is classified into four groups, according to the four shift stages respectively representing four forward speeds.

Second, the fuzzy set for each shift stage is obtained. In this case, the vehicle speed, acceleration and throttle position are considered as a precedent premise, and the gradient as a subsequent premise. The average value of the precedent and subsequent premises serves as a reference point to obtain the fuzzy subsets. The function of each fuzzy subset is chosen to have a trapezoidal shape with a triangular function. The following equations are then obtained:

$$X_k = [V_o \; G_x \phi \; \theta]^T C^* = (C_{MIN}, X_L, X_R, C_{MAX})$$

Wherein Xk represents the Kth data vector of the precedent and subsequent premises of the data obtained in the first step, and $C^*$ represents the fuzzy cluster parameter. In the fuzzy cluster parameter, $X_L$ and $X_R$ respectively represent the left and the right values of a crisp interval of a trapezoidal fuzzy variable whose corresponding function has the value of one, and the corresponding function of the triangle is when $X_L = X_R$. In this case, $C_{MIN}$ and $C_{MAX}$ are the real value of the crisp variable in which the fuzzy membership function value is 0.5.

Third, the corresponding function of the triangle is obtained. The design parameter of the algorithm is represented as $\varepsilon_x = MAX\{C_{MAX} - X, X - C_{MIN}\}$, and the circulatory learning equation is represented as $X_{K+1} = X_K + (X_{K+1} - X_k)/(K+1)$. The rule obtained by this represents the fuzzy cluster of "$C_{MIN}, C_{MAX}$".

Finally, since each cluster of the fuzzy subset represents a rule, a rule aggregation method is then employed to aggregate the rules into the fuzzy subset of trapezoidal shape. This reduces the rule size.

Figure 3:
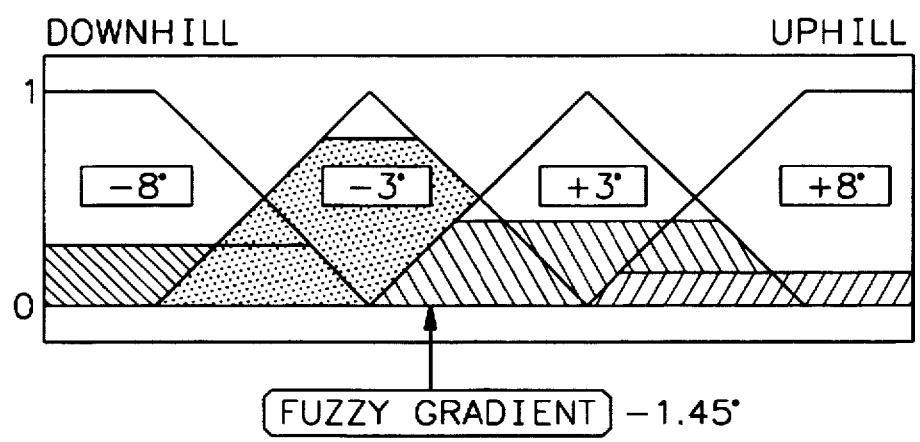

Based on the fuzzy rules obtained in step S100, the road gradient is obtained. The gradient is the fuzzy variable of the subsequent premise and may be calculated by a fuzzy inference processor according to the four variables of the precedent premise (i.e., vehicle speed, acceleration, throttle position, and current shift stage). To this end, centroid defuzzification is employed, as shown in FIG. 3. The fuzzy inference processor calculates a gradient equation under the following conditions:

1. Vehicle speed (Vo): 10Km/h<Vo<80Km/h
2. Brake switch: Off

3. Shifting signal: Off

Gradient Equation Obtained by the Centroid Defuzzification:

$$\text{SLOPE(GRADIENT)} = \frac{\sum_{\text{RULE}} (D.O.F. \text{ of each RULE}) * (\theta \text{ learned value})}{\sum_{\text{RULE}} (D.O.F. \text{ of each RULE})}$$

where D.O.F. means Degree of Fulfillment.

According to this result, the optimum shift stage is determined using the fuzzy inference processor (step S300). The automatic transmission then controls the vehicle speed and shift stage according to the eight modes below, selected based upon the driver's intention and the road condition. These eight modes are described as follows:

1. Normal Mode:
   Works according to a selected shift pattern when running on a level, smooth road.
2. Anti-Upshift Mode:
   Prevents the upshift from the second to the third or from the third to the fourth shift stage when running on a level crisp road at a low speed.
3. Engine Brake Mode 1:
   Carries out the automatic downshift from the fourth to the third shift stage when running on a low downward sloping road.
4. Engine Brake Mode 2:
   Carries out the automatic downshift from the third to the second shift stage when running on a steep, downward sloping road.
5. Anti-Hunting Mode:
   Carries out the quick downshift from the fourth to the third and again to the second when running on a level road at a medium or low speed.
6. Anti-Slip Mode 1:
   Prevents the shift from the third to the second shift stage or from the third to the fourth shift stage when running on a smooth, slippery, sloping road.
7. Anti-Slip Mode 2:
   Prevents the shift from the second to the first shift stage or from the second to the third shift stage when running on a crisp, slippery, sloping road.
8. Cooling Mode:
   Lowers the temperature of the heated working fluid to prevent overheating.

Figure 2:
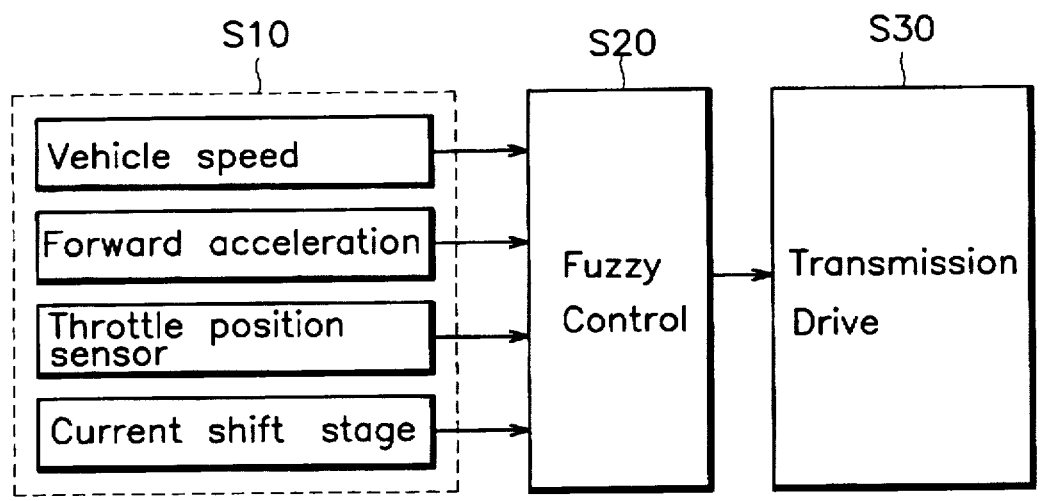

Referring to FIG. 2, a system for determining the shift stage of an automatic transmission by using fuzzy inference to decide road gradient includes: a fuzzy input part S10 for collecting data on the vehicle speed, acceleration, throttle position, and the current shift stage; a fuzzy control S20 for controlling the data collected by the fuzzy input part; and a transmission drive S30 for shifting gears to the optimum shift stage.

Thus, it is possible to automatically provide the fuzzy rule required to calculate the road gradient. The real road gradient may be obtained by fuzzy inference based on the learned fuzzy rule of the gradient, making it possible to determine the optimum shift stage.

What is claimed is:

1. A process for determining a shift stage of an automatic transmission of a vehicle by using fuzzy inference, the process comprising the steps of:

determining vehicle data representing a state of the vehicle for various shift stages of the automatic transmission and road conditions;

determining a fuzzy cluster, based on the determined vehicle data, for each shift stage;

equating each fuzzy cluster to a rule which controls the shift stage of the automatic transmission;

calculating a road gradient value based on the rules; and determining an optimum shift stage of the automatic transmission based on the calculated road gradient.

2. The process of claim 1, wherein the step of determining the vehicle data includes the substep of:

classifying the vehicle data into groups corresponding to each shift stage of the automatic transmission.

3. The process of claim 2, wherein the step of determining a fuzzy cluster includes the substep of:

determining a first fuzzy cluster for each shift stage of the automatic transmission;

recursively determining a second fuzzy cluster for each shift stage using a triangular function corresponding to the first fuzzy clusters; and aggregating the number of redundant second fuzzy clusters to produce an optimized set of rules.

4. The process of claim 1, wherein the step of determining the vehicle data includes the substep of:

determining a road gradient and the vehicle's speed, acceleration, and throttle position.

5. The process of claim 4, wherein the step of calculating a road gradient includes the substep of:

calculating the road gradient according to a centroid defuzzification process by solving the following equation:

$$\text{road gradient} = \frac{\sum_{\text{RULE}} (D.O.F. \text{ of each RULE}) * (\theta \text{ learned value})}{\sum_{\text{RULE}} (D.O.F. \text{ of each RULE})}$$

where D.O.F. means the degree of fulfillment, and $\theta$ represents the road gradient determined by the step of determining the vehicle data.

6. The process of claim 1, wherein the step of determining an optimum shift stage includes the substeps of:

selecting a shift mode, from a plurality of preset shift modes, based on the calculated road gradient, and wherein the plurality of preset shift modes include: a normal mode, an anti-upshift mode, an engine brake mode, an anti-hunting mode, an anti-slip mode, and a cooling mode; and controlling the automatic transmission according to the selected shift mode.

7. A system for determining the shift stage of an automatic transmission of a vehicle by using fuzzy interference, comprising:

a fuzzy input part for collecting vehicle data representing a state of the vehicle for various shift stages of the automatic transmission and road conditions;

a fuzzy controller including:

means for determining a fuzzy cluster, based on the determined vehicle data, for each shift stage of the automatic transmission;

means for equating each fuzzy cluster to a rule which controls the shift stage of the automatic transmission;

means for calculating a road gradient value based on the rules; and means for determining an optimum shift stage of the automatic transmission based on the calculated road gradient; and a transmission drive for shifting a transmission gear of the vehicle according to the optimum shift stage.

* * * * *